United States Patent
Nakagawa et al.

(10) Patent No.: US 10,351,672 B2
(45) Date of Patent: Jul. 16, 2019

(54) POLYMER COMPOUND FORMED BY CONDENSING POLYACRYLIC ACID, POLYAMINE AND AROMATIC MONOAMINE, INTERMEDIATE COMPOSITION, NEGATIVE ELECTRODE, ELECTRICAL STORAGE DEVICE, SLURRY FOR NEGATIVE ELECTRODE, METHOD FOR PRODUCING POLYMER COMPOUND, AND METHOD FOR PRODUCING NEGATIVE ELECTRODE

(71) Applicant: KABUSHIKI KAISHA TOYOTA JIDOSHOKKI, Kariya-shi, Aichi-ken (JP)

(72) Inventors: Yuta Nakagawa, Kariya (JP); Yusuke Sugiyama, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 16/075,753

(22) PCT Filed: Jan. 30, 2017

(86) PCT No.: PCT/JP2017/003140
§ 371 (c)(1),
(2) Date: Aug. 6, 2018

(87) PCT Pub. No.: WO2017/141674
PCT Pub. Date: Aug. 24, 2017

(65) Prior Publication Data
US 2019/0040199 A1 Feb. 7, 2019

Related U.S. Application Data

(63) Continuation of application No. PCT/JP2017/003140, filed on Jan. 30, 2017.

(30) Foreign Application Priority Data

Feb. 18, 2016 (JP) .................. 2016-028984

(51) Int. Cl.
| | |
|---|---|
| H01M 4/13 | (2010.01) |
| H01M 4/62 | (2006.01) |
| C08G 69/34 | (2006.01) |
| C08L 77/08 | (2006.01) |
| H01G 11/06 | (2013.01) |
| H01G 11/38 | (2013.01) |
| H01G 11/86 | (2013.01) |
| H01M 4/133 | (2010.01) |
| H01M 4/134 | (2010.01) |
| H01M 4/139 | (2010.01) |
| H01M 4/1393 | (2010.01) |
| H01M 4/1395 | (2010.01) |

(52) U.S. Cl.
CPC ............. *C08G 69/34* (2013.01); *C08L 77/08* (2013.01); *H01G 11/06* (2013.01); *H01G 11/38* (2013.01); *H01G 11/86* (2013.01); *H01M 4/13* (2013.01); *H01M 4/133* (2013.01); *H01M 4/134* (2013.01); *H01M 4/139* (2013.01); *H01M 4/1393* (2013.01); *H01M 4/1395* (2013.01); *H01M 4/62* (2013.01); *H01M 4/622* (2013.01)

(58) Field of Classification Search
CPC ...... C08G 69/34; H01M 4/133; H01M 4/134; H01M 4/1393; H01M 4/1395; H01M 4/62; H01M 4/622
USPC .......................................... 429/217; 528/289
See application file for complete search history.

(56) References Cited

U.S. PATENT DOCUMENTS

| | | | | |
|---|---|---|---|---|
| 3,551,211 A * | 12/1970 | Grulke | ...................... | C08F 8/30 429/307 |
| 2009/0136845 A1 | 5/2009 | Choi et al. | | |
| 2014/0154562 A1* | 6/2014 | Fukuchi | ............... | H01M 10/052 429/211 |
| 2014/0312268 A1 | 10/2014 | Lim | | |

(Continued)

FOREIGN PATENT DOCUMENTS

| | | |
|---|---|---|
| JP | 2003-003031 A | 1/2003 |
| JP | 2008-034379 A1 | 2/2008 |

(Continued)

OTHER PUBLICATIONS

International Search report of PCT/JP2017/003140 filed Apr. 4, 2017.

*Primary Examiner* — Sean P Cullen
(74) *Attorney, Agent, or Firm* — Sughrue Mion, PLLC

(57) ABSTRACT

A polymer compound is formed by condensing a polyacrylic acid, a polyfunctional amine represented by the following general formula (1), and an aromatic monoamine. A chain structure constituted by the polyacrylic acid has free carboxyl groups and carboxyl groups to which the aromatic monoamines are bonded.

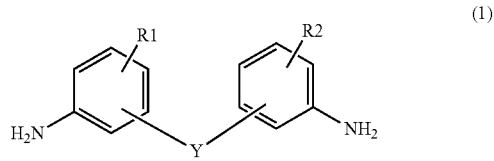

Y is a straight-chain alkyl group having 1 to 4 carbon atoms, a phenylene group, or an oxygen atom. R1 and R2 are each independently one or more hydrogen atoms, a methyl group, an ethyl group, a trifluoromethyl group, or a methoxy group.

12 Claims, No Drawings

(56) References Cited

U.S. PATENT DOCUMENTS

| | | |
|---|---|---|
| 2017/0062828 A1 | 3/2017 | Sonobe et al. |
| 2017/0324094 A1 | 11/2017 | Sugiyama et al. |
| 2017/0331114 A1 | 11/2017 | Sugiyama et al. |

FOREIGN PATENT DOCUMENTS

| | | |
|---|---|---|
| JP | 2009-080971 A | 4/2009 |
| JP | 2009-135103 A | 6/2009 |
| JP | 2009-256570 A | 11/2009 |
| JP | 2014-123557 A | 7/2014 |
| WO | 2015/186363 A1 | 12/2015 |
| WO | 2016/063882 A1 | 4/2016 |
| WO | 2016/084548 A1 | 6/2016 |

* cited by examiner

POLYMER COMPOUND FORMED BY CONDENSING POLYACRYLIC ACID, POLYAMINE AND AROMATIC MONOAMINE, INTERMEDIATE COMPOSITION, NEGATIVE ELECTRODE, ELECTRICAL STORAGE DEVICE, SLURRY FOR NEGATIVE ELECTRODE, METHOD FOR PRODUCING POLYMER COMPOUND, AND METHOD FOR PRODUCING NEGATIVE ELECTRODE

CROSS-REFERENCE TO RELATED APPLICATION

This application is a National Stage of International Application No. PCT/JP2017/003140 filed Jan. 30, 2017, claiming priority based on Japanese Patent Application No. 2016-028984 filed Feb. 18, 2016.

TECHNICAL FIELD

The present disclosure relates to a polymer compound to be used as a binder for a negative electrode of a power storage device, an intermediate composition of the polymer compound, a negative electrode, a power storage device, a slurry for the negative electrode, a method for producing the polymer compound, and a method for producing the negative electrode.

BACKGROUND ART

Products using rechargeable batteries go on increasing. Rechargeable batteries are much used in portable devices such as cell phones and laptop computers. Rechargeable batteries are paid attention to also as large power sources for electric cars.

Electrodes of rechargeable batteries are constituted, for example, of a current collector formed of a metal material such as copper or aluminum, and an active substance layer bound on the current collector. The active substance layer generally contains a binder for electrodes for binding an active substance on the current collector. In recent years, as the binder for electrodes, polyacrylic acid, which is an inexpensive polymer compound, has been utilized. For example, Patent Document 1 discloses a binder for electrodes containing a polyacrylic acid lithium salt or a polyacrylic acid sodium salt. Patent Document 2 discloses a binder for electrodes containing a polyacrylic acid and a polyethyleneimine. Patent Document 3 discloses a binder for electrodes containing a polyacrylic acid and an amine compound.

PRIOR ART DOCUMENTS

Patent Documents

Patent Document 1: Japanese Laid-Open Patent Publication No. 2009-080971
Patent Document 2: Japanese Laid-Open Patent Publication No. 2009-135103
Patent Document 3: Japanese Laid-Open Patent Publication No. 2003-003031

SUMMARY

Problems that the Disclosure is to Solve

As a result of exhaustive studies, the present researchers have found that a polymer compound formed by condensing a polyacrylic acid, a polyfunctional amine having a specific molecular structure, and an aromatic monoamine is useful as a binder for a negative electrode of a power storage device such as a rechargeable battery. An objective of the present disclosure is to provide a polymer compound useful as a binder for a negative electrode of a power storage device, an intermediate composition for obtaining the polymer compound, and a negative electrode, a power storage device and a slurry for the negative electrode which use the polymer compound as the binder for a negative electrode. Further, an objective of the present disclosure is to provide a method for producing the polymer compound, and a method for producing the negative electrode.

Means for Solving the Problems

To achieve the foregoing objective and in accordance with a first aspect of the present disclosure, a polymer compound to be used as a binder for a negative electrode of a power storage device is provided. The polymer compound is formed by condensing a polyacrylic acid, a polyfunctional amine represented by the following general formula (1), and an aromatic monoamine. A chain structure constituted by the polyacrylic acid has free carboxyl groups and carboxyl groups to which the aromatic monoamines are bonded.

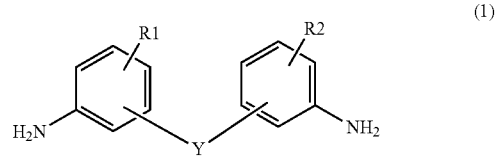
(1)

Y is a straight-chain alkyl group having 1 to 4 carbon atoms, a phenylene group, or an oxygen atom. R1 and R2 are each independently one or more hydrogen atoms, a methyl group, an ethyl group, a trifluoromethyl group, or a methoxy group.

To achieve the foregoing objective and in accordance with a second aspect of the present disclosure, a polymer compound to be used as a binder for a negative electrode of a power storage device is provided. The polymer compound has a chain structure constituted by a polyacrylic acid, and a crosslinked structure connecting carboxyl groups in the chain structure or between the chain structures with each other. The crosslinked structure is at least one crosslinked structure selected from the following general formulae (2) to (4). The chain structure has free carboxyl groups and carboxyl groups to which aromatic monoamines are bonded.

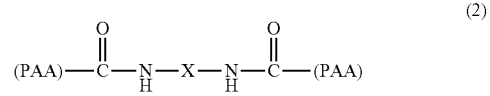
(2)

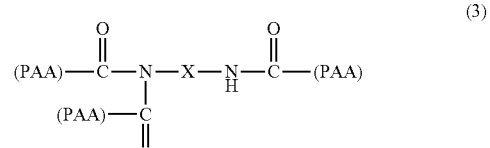
(3)

-continued

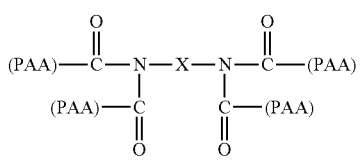

PAA denotes the chain structure constituted by the polyacrylic acid; and X is a structure represented by the following general formula (5).

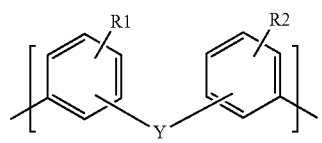

Y is a straight-chain alkyl group having 1 to 4 carbon atoms, a phenylene group, or an oxygen atom. R1 and R2 are each independently a hydrogen atom, a methyl group, a trifluoromethyl group, or a methoxy group.

To achieve the foregoing objective and in accordance with a third aspect of the present disclosure, an intermediate composition of a polymer compound to be used as a binder for a negative electrode of a power storage device is provided. The composition is in a liquid state and contains a polyacrylic acid, a polyfunctional amine represented by the following general formula (1), an aromatic monoamine, and a nonaqueous solvent.

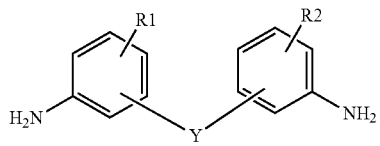

Y is a straight-chain alkyl group having 1 to 4 carbon atoms, a phenylene group or an oxygen atom. R1 and R2 are each independently one or more hydrogen atoms, a methyl group, an ethyl group, a trifluoromethyl group, or a methoxy group.

To achieve the foregoing objective and in accordance with a fourth aspect of the present disclosure, a method for producing a polymer compound is provided that includes heating a polyacrylic acid, a polyfunctional amine represented by the following general formula (1), and an aromatic monoamine at 150 to 230° C.

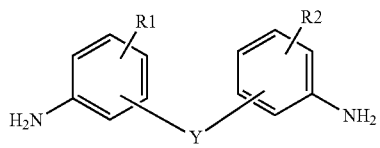

Y is a straight-chain alkyl group having 1 to 4 carbon atoms, a phenylene group, or an oxygen atom. R1 and R2 are each independently one or more hydrogen atoms, a methyl group, an ethyl group, a trifluoromethyl group, or a methoxy group.

To achieve the foregoing objective and in accordance with a fifth aspect of the present disclosure, a negative electrode of a power storage device is provided that includes a binder for a negative electrode containing the above-describe polymer compound and a negative electrode active substance. The negative electrode active substance is at least one selected from carbon-based materials capable of occluding and releasing lithium, elements alloyable with lithium, and compounds having an element alloyable with lithium.

To achieve the foregoing objective and in accordance with a sixth aspect of the present disclosure, a nonaqueous electrolyte and a power storage device that includes the above-described negative electrode is provided.

To achieve the foregoing objective and in accordance with a seventh aspect of the present disclosure, a slurry for a negative electrode to be used for production of a negative electrode of a power storage device is provided. The slurry contains the above-described intermediate composition, a negative electrode active substance, and a solvent. The negative electrode active substance is at least one selected from carbon-based materials capable of occluding and releasing lithium, elements alloyable with lithium, and compounds having an element alloyable with lithium.

To achieve the foregoing objective and in accordance with an eighth aspect of the present disclosure, a method for producing a negative electrode of a power storage device is provided. A negative electrode active substance layer is formed on a current collector by using the above-described slurry for a negative electrode.

MODES FOR CARRYING OUT THE DISCLOSURE

One embodiment of the present disclosure will now be described.

A polymer compound according to the present embodiment is a compound formed by condensing (A) a polyacrylic acid, (B) a polyfunctional amine, and (C) an aromatic monoamine.

The (A) polyacrylic acid is a homopolymer composed of acrylic acid. The weight average molecular weight of the polyacrylic acid is not particularly limited, but is, for example, preferably in the range of 10,000 to 2,000,000, more preferably in the range of 25,000 to 1,800,000, and still more preferably in the range of 50,000 to 1,500,000.

When a conventional polymer compound such as a polyamide-imide is used as a binder for a negative electrode, the cycle characteristic of a power storage device is likely to deteriorate in accordance with a decrease in the weight average molecular weight of the polymer compound. By contrast, when the polymer compound according to the present embodiment is used as a binder for a negative electrode, even if the weight average molecular weight of the polyacrylic acid constituting the polymer compound is low, the cycle characteristic of a power storage device is maintained. Hence, as the (A) polyacrylic acid, polyacrylic acids having a low molecular weight of, for example, 250,000 or lower or 100,000 or lower are suitably used.

The (B) polyfunctional amine is a compound having a structure represented by the following general formula (1).

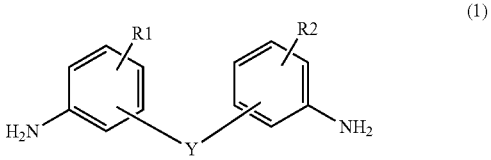

where Y is a straight-chain alkyl group having 1 to 4 carbon atoms, a phenylene group or an oxygen atom; and the bonding position of Y in each benzene ring may be any of ortho, meta and para positions to the amino group.

When Y is a straight-chain alkyl group or a phenylene group, a substituent(s) may be bonded to a carbon atom(s) constituting the structure. Examples of the substituent(s) bonded to a carbon atom(s) constituting the straight-chain alkyl group include a methyl group, an ethyl group, a fluoromethyl group, a difluoromethyl group, a trifluoromethyl group, a methoxy group, an ethoxy group, and an oxo group. Only one of these substituents may be bonded, or two or more of them may be bonded. Further, the number of substituents bonded to one carbon atom may be one or may be two. Further, a substituent(s) bonded to a carbon atom(s) constituting the straight-chain alkyl group or the phenylene group may be an amino group or a substituent containing an amino group; and in this case, the polyfunctional amine becomes a polyfunctional amine having 3 or more amino groups.

In the general formula (1), R1 and R2 are each independently one or more hydrogen atoms, a methyl group, an ethyl group, a trifluoromethyl group, or a methoxy group. When R1 is a methyl group, an ethyl group, a trifluoromethyl group, or a methoxy group, the bonding position of R1 may be any of ortho, meta, and para positions to the amino group. The same is applied also to R2.

Specific examples of the (B) polyfunctional amine will be described.

Examples of the polyfunctional amine in which Y is a straight-chain alkyl group include 3,3'-diaminodiphenylmethane, 4,4'-diaminodiphenylmethane, 3,4'-diaminodiphenylmethane, 4,4'-ethylenedianiline, 4,4'-diamino-3,3'-dimethyldiphenylmethane, 1,1-bis(4-aminophenyl)cyclohexane, 9,9-bis(4-aminophenyl)fluorene, 2,2'-bis(4-aminophenyl)hexafluoropropane, 4,4'-diaminobenzophenone, 4,4'-methylenebis(2-ethyl-6-methylaniline), and pararosaniline.

Examples of the polyfunctional amine in which Y is a phenylene group include 1,3,5-tris(4-aminophenyl)benzene. Examples of the polyfunctional amine in which Y is an oxygen atom include 4,4'-diaminodiphenyl ether. 1,3,5-tris (4-Aminophenyl)benzene and pararosaniline are trifunctional amines having three amino groups. Only one of the above polyfunctional amines may be used or two or more thereof may be used concurrently.

The (C) aromatic monoamine is an aromatic compound in which an amino group, being a weak base, is bonded to an aromatic compound having an aromatic ring structure, and has only one amino group condensable with a carboxyl group of the (A) polyacrylic acid.

Examples of the aromatic ring structure include monocyclic structures such as 4-membered rings to 8-membered rings and polycyclic structures in combination of a plurality of (for example, two or three) 4-membered rings to 8-membered rings. The aromatic ring structure may be a ring structure composed of carbon, or may be a heterocyclic structure containing elements other than carbon. Then, the (C) aromatic monoamine may be a primary amine or may be a secondary amine.

Specific examples of the (C) aromatic monoamine include aniline, 1-naphthylamine, 2-naphthylamine, 2-aminoanthracene, 1-aminoanthracene, 9-aminoanthracene, 1-aminopyrene, 2-aminopyrene, 2-aminophenol, 3-aminophenol, 4-aminophenol, 2-fluoroaniline, 3-fluoroaniline, 4-fluoroaniline, 2-chloroaniline, 3-chloroaniline, 4-chloroaniline, 2-bromoaniline, 3-bromoaniline, 4-bromoaniline, 2-iodoaniline, 3-iodoaniline, 4-iodoaniline, o-toluidine, m-toluidine, p-toluidine, 4-aminotriphenylamine, 2,3-difluoroaniline, 2,4-difluoroaniline, 2,5-difluoroaniline, 2,6-difluoroaniline, 3,4-difluoroaniline, 3,5-difluoroaniline, 2,3-dichloroaniline, 2,4-dichloroaniline, 2,5-dichloroaniline, 2,6-dichloroaniline, 3,4-dichloroaniline, 3,5-dichloroaniline, 2,3-dibromoaniline, 2,4-dibromoaniline, 2,5-dibromoaniline, 2,6-dibromoaniline, 3,4-dibromoaniline, 3,5-dibromoaniline, 2,3-diiodoaniline, 2,4-diiodoaniline, 2,5-diiodoaniline, 2,6-diiodoaniline, 3,4-diiodoaniline, 3,5-diiodoaniline, 2,3-dimethylaniline, 2,4-dimethylaniline, 2,5-dimethylaniline, 2,6-dimethylaniline, 3,4-dimethylaniline, 3,5-dimethylaniline, 2,4,6-trifluoroaniline, 2,3,4-trifluoroaniline, 2,3,5-trifluoroaniline, 2,3,6-trifluoroaniline, 2,4,5-trifluoroaniline, 3,4,5-trifluoroaniline, 2,4,6-trichloroaniline, 2,3,4-trichloroaniline, 2,3,5-trichloroaniline, 2,3,6-trichloroaniline, 2,4,5-trichloroaniline, 3,4,5-trichloroaniline, 2,4,6-tribromoaniline, 2,3,4-tribromoaniline, 2,3,5-tribromoaniline, 2,3,6-tribromoaniline, 2,4,5-tribromoaniline, 3,4,5-tribromoaniline, 2,4,6-triiodoaniline, 2,3,4-triiodoaniline, 2,3,5-triiodoaniline, 2,3,6-triiodoaniline, 2,4,5-triiodoaniline, 3,4,5-triiodoaniline, 2,4,6-trimethylaniline, 2,3,4-trimethylaniline, 2,3,5-trimethylaniline, 2,3,6-trimethylaniline, 2,4,5-trimethylaniline, 3,4,5-trimethylaniline, N,N-dimethyl-1,4-phenylenediamine, N,N-dimethyl-4,4'-diaminodiphenylmethane, 2-anisidine, 3-anisidine, 4-anisidine, 2-aminobenzenethiol, 3-aminobenzenethiol, 4-aminobenzenethiol, 2-aminobenzonitrile, 3-aminobenzonitrile and 4-aminobenzonitrile. Only one of these aromatic monoamines may be used, or two or more of them may be used concurrently.

The blend proportion of the (A) polyacrylic acid, the (B) polyfunctional amine and the (C) aromatic monoamine is set so that the following relational expression 1 is satisfied among the total number a of carboxyl groups derived from the (A) polyacrylic acid, the total number b of amino groups derived from the (B) polyfunctional amine and the total number c of amino groups derived from the (C) aromatic monoamine, and is preferably set so that besides the relational expression 1, the following relational expression 2 and relational expression 3 are further satisfied.

$a > b + c$ 　　　　　　　　　　　Relational expression 1

$a/b = 1.5/1$ to $15/1$ (more preferably $2/1$ to $10/1$) 　　　　　Relational expression 2

$c/(a-b-c) = 0.001/1$ to $0.15/1$ (more preferably $0.01/1$ to $0.1/1$) 　　　　　Relational expression 3

The above blend proportion in the polymer compound formed by condensing the (A) polyacrylic acid, the (B) polyfunctional amine and the (C) aromatic monoamine is set so that free carboxyl groups remain by satisfying the relational expression 1, and the above blend proportion is set so that free carboxyl groups and carboxyl groups to which the (C) aromatic monoamine is added are present in a specific ratio by satisfying the relational expression 2 and the relational expression 3.

The polymer compound according to the present embodiment is obtained by carrying out a mixing step of mixing the (A) polyacrylic acid, the (B) polyfunctional amine, and the (C) aromatic monoamine in a solvent, and a heating step of subjecting an intermediate composition obtained in the mixing step to a heat treatment.

The mixing step is a step in which a liquid intermediate composition formed by mixing the (A) polyacrylic acid, the (B) polyfunctional amine, the (C) aromatic monoamine, and a solvent is obtained. As the solvent to be used in the mixing step, a solvent in which the (A) polyacrylic acid, the (B) polyfunctional amine, and the (C) aromatic monoamine are dissolved is suitably selected and used. Particularly, from the viewpoint of improving the dissolvability, it is preferable to use a nonaqueous solvent such as N-methyl-2-pyrrolidone, dimethylformamide, dimethylacetamide, dimethyl sulfoxide, propylene carbonate, γ-butyrolactone, ethanol, or propanol.

The heating step is a step of subjecting the intermediate composition to a heat treatment to thereby condense the (A) polyacrylic acid, the (B) polyfunctional amine, and (C) aromatic monoamine contained in the intermediate composition with each other. The heating temperature in the heating step is, from the viewpoint of efficiently forming amide bond portions and imide bond portions between the (A) polyacrylic acid, the (B) polyfunctional amine, and (C) aromatic monoamine preferably in the range of 150 to 230° C., and more preferably in the range of 180 to 200° C. When the heating temperature is raised, the characteristic (cycle characteristic) of power storage devices such as rechargeable batteries can be enhanced, when the polymer compound according to the present embodiment is used as the binder for a negative electrode.

When the intermediate composition is heated, a catalyst may be added to the intermediate composition in order to progress the condensation reaction to form amide bonds and imide bonds or to enhance the reaction rate of the condensation reaction. As the catalyst, for example, dehydration condensation catalysts such as 1-methylimidazole, 2-methylimidazole, N,N'-dicyclohexylcarbodiimide, N,N'-carbonyldiimidazole, N,N'-diisopropylcarbodiimide, 1-[3-(dimethylamino)propyl]-3-ethylcarbodiimide, 1-ethyl-3-(3-dimethylaminopropyl)carbodiimide.hydrochloric acid, diphenylphosphoric acid azido, and BOP reagents can effectively be used. When these catalysts are added, since amide bonds and imide bonds are formed at a lower temperature, the production efficiency of the polymer compound is enhanced.

It is preferable that the intermediate composition be subjected to a preheat treatment before the heating step. The preheating temperature is preferably in the range of 40 to 140° C., and more preferably in the range of 60 to 130° C. The preheat treatment associates the (A) polyacrylic acid, (B) polyfunctional amine, and (C) aromatic monoamine contained in the intermediate composition with each other and forms such a state that it is easy for the condensation reaction of the carboxyl groups with the amino groups to progress. Consequently, in the heating step, the condensation reaction efficiently progresses. By the preheat treatment, the condensation reaction of the carboxyl groups with the amino groups may partially progress and form amide bond portions and imide bond portions.

Then, when the preheated intermediate composition is used, it is preferable that the heating step be carried out in such a state that the solvent contained in the intermediate composition have been removed. In this case, it becomes easy for the condensation reaction of the (A) polyacrylic acid, the (B) polyfunctional amine, and the (C) aromatic monoamine with each other to progress.

Then, by carrying out the heating step, the polymer compound formed by condensing the (A) polyacrylic acid, the (B) polyfunctional amine, and the (C) aromatic monoamine is obtained. It is conceivable that the polymer compound has a structure in which at least one of amide bonds and imide bonds is formed between carboxyl groups of the (A) polyacrylic acid and amino groups of the (B) polyfunctional amine and the (A) polyacrylic acids are crosslinked.

Further, it is conceivable that at least one of amide bonds and imide bonds is formed between carboxyl groups of the (A) polyacrylic acid and the (C) aromatic monoamine and the polymer compound has carboxyl groups to which the aromatic monoamines are added.

That is, the polymer compound has a chain structure constituted by the polyacrylic acid and a crosslinked structure in which carboxyl groups in the chain structure or between the chain structures are connected. Then, in the chain structure constituted by the polyacrylic acid, free carboxyl groups and carboxyl groups to which the aromatic monoamines are bonded are present; and the crosslinked structure is at least one crosslinked structure selected from the following general formulae (2) to (4). In the chain structure of the polymer compound, the proportion of carboxyl groups to which the aromatic monoamines are bonded to free carboxyl groups (carboxyl groups to which the aromatic monoamines are bonded/free carboxyl groups) is preferably in the range of 0.001 to 0.15.

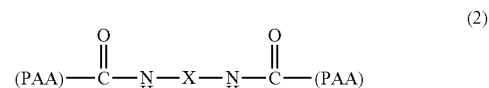

(2)

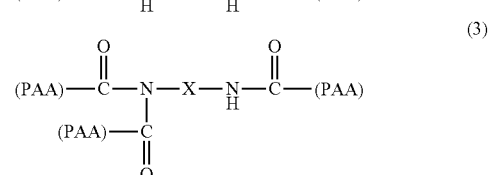

(3)

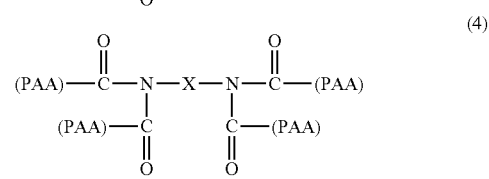

(4)

In the general formulae (2) to (4), PAA denotes a chain structure constituted by the polyacrylic acid. X is a structure represented by the following general formula (5). In the general formulae (3) to (4) having an imide structure, two carbonyl groups constituting one imide structure may be ones each bonded to a different chain structure, or may be ones bonded to the same chain structure. For example, when two carbonyl groups constituting an imide structure are ones bonded to adjacent carbons in the same chain structure, the imide structure forms a maleimide structure.

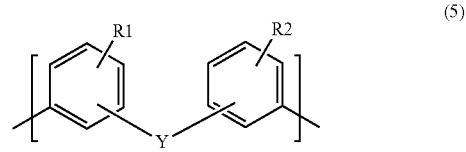

(5)

Y in the general formula (5) is a straight-chain alkyl group having 1 to 4 carbon atoms, a phenylene group, or an oxygen atom. The bonding position of Y in each benzene ring may be any of ortho, meta, and para positions to the amino group. Y in the general formula (5) is a structure according to Y in the general formula (1).

In the general formula (5), R1 and R2 are each independently one or more hydrogen atoms, a methyl group, an ethyl group, a trifluoromethyl group, or a methoxy group. When R1 is a methyl group, a trifluoromethyl group, or a methoxy group, the bonding position of R1 may be any of ortho, meta, and para positions to the amino group. The same is applied also to R2. R1 and R2 in the general formula (5) have structures according to R1 and R2 in the general formula (1).

It is preferable that the polymer compound have both of amide bond portions and imide bond portions in its crosslinked structure. That is, it is preferable that the polymer compound has, as its crosslinked structure, at least, crosslinked structures of the general formula (2) and the general formula (4), or at least a crosslinked structure of the general formula (3).

Then, the polymer compound according to the present embodiment may further have a second crosslinked structure.

As a polymer compound further having a second crosslinked structure, the polymer compound may be, for example, the compound formed by condensing the (A) polyacrylic acid with the (B) polyfunctional amine represented by the general formula (1) and other polyfunctional amines. In this case, the polymer compound has, in addition to a crosslinked structure derived from the polyfunctional amine represented by the general formula (1), further a second crosslinked structure derived from the other polyfunctional amines. By adding the second crosslinked structure, physical properties, such as strength and flexibility, of the polymer compound can be adjusted.

Examples of the other polyfunctional amines include 1,4-diaminobutane, 1,6-diaminohexane, 1,8-diaminooctane, 2-aminoaniline (1,2-phenylenediamine), 3-aminoaniline (1,3-phenylenediamine), 4-aminoaniline (1,4-phenylenediamine), 2,4-diaminopyridine, 2,5-diaminopyridine, 2,6-diaminopyridine, and 1,3-diiminoisoindoline.

The blend proportion of the other polyfunctional amines is, with respect to 10 parts by mass of the (B) polyfunctional amine represented by the general formula (1), preferably 1 part by mass or lower. By making the proportion to be the above proportion, it can be suppressed that physical properties, such as strength and flexibility, of the polymer compound largely vary and become unsuitable to the binder for a negative electrode.

Then, one example of a method for producing a negative electrode using the polymer compound according to the present embodiment as a binder for a negative electrode will be described.

First, a negative electrode active substance, a binder for a negative electrode, and a solvent are mixed to thereby prepare a slurry. At this time, as required, other components such as a conductive auxiliary agent may further be mixed.

As the negative electrode active substance, a known substance used as a negative electrode active substance of power storage devices such as rechargeable batteries, for example, a carbon-based material, an element alloyable with lithium, or a compound having an element alloyable with lithium can be used.

As the carbon-based material, for example, a carbon-based material capable of occluding and releasing lithium; and specific examples thereof include non-graphitizable carbon, natural graphite, artificial graphite, cokes, graphites, glasslike carbons, organic polymer compound baked bodies, carbon fibers, active carbon and carbon blacks can be used.

Examples of the element alloyable with lithium include Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, Si is particularly preferable.

Examples of the compound having an element alloyable with lithium include compounds having element(s) selected from Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Among these, silicon-based materials being compounds having Si are particularly preferable.

Examples of the silicon-based materials include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_6Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_V$ ($0<V\leq2$), $SnSiO_3$, and $LiSiO$. Among these, $SiO_V$ ($0<V\leq2$) is particularly preferable.

Further, as disclosed in International Publication No. WO 2014/080608, there can also be used a silicon material obtained from $CaSi_2$ through a calcium-removal reaction. The silicon material is obtained, for example, by removing calcium (for example, a heat treatment at 300 to 1,000° C.) from a layered polysilane obtained by treating $CaSi_2$ with an acid (for example, hydrochloric acid or hydrogen fluoride).

It is particularly preferable that the polymer compound according to the present embodiment be used in a combination with a silicon-based material being a negative electrode active substance large in the degree of expansion and contraction in charge and discharge. As the negative electrode active substance, only one of the above substances may be used, or two or more thereof may be used concurrently.

As the binder for a negative electrode to be mixed in the slurry, the above intermediate composition is used.

Further, as the binder for a negative electrode, other binders for a negative electrode may be used concurrently. Examples of the other binders for a negative electrode include polyvinylidene fluoride, polyethylene tetrafluoride, styrene-butadiene rubber, polyimide, polyamideimide, carboxymethylcellulose, polyvinyl chloride, methacryl resins, polyacrylonitrile, modified polyphenylene oxide, polyethylene oxide, polyethylene, polypropylene, polyacrylic acid, and phenol resins.

Only one of these other binders for a negative electrode may be used, or two or more thereof may be used concurrently. When other binders for a negative electrode are concurrently used, the solid content of the intermediate composition is contained preferably in 1% by mass or more, and more preferably in 10% by mass or more, in the total solid content of the binder for a negative electrode.

The blend proportion in mass ratio of the negative electrode active substance to the binder for a negative electrode (negative electrode active substance: binder for a negative electrode) can suitably be set according to the negative electrode active substance and the binder for a negative electrode. The blend proportion is, for example, preferably in the range of 5:3 to 99:1, more preferably in the range of 3:1 to 97:3, and still more preferably in the range of 16:3 to 95:5. Then, when the negative electrode active substance is the above silicon material disclosed in International Publication No. WO2014/080608, the blend proportion in mass ratio of the negative electrode active substance to the binder for a negative electrode (negative electrode active substance: binder for a negative electrode) is preferably in the range of 3:1 to 7.5:1, and more preferably 4:1 to 5:1.

As the solvent, a known solvent to be used in fabrication of electrodes of power storage devices such as rechargeable batteries can suitably be used according to the kinds of the negative electrode active substance and the binder for a negative electrode. Specific examples of the solvent include N-methyl-2-pyrrolidone, methanol, and methyl isobutyl ketone.

As the conductive auxiliary agent, a known conductive auxiliary agent to be used for a negative electrodes of power storage devices such as rechargeable batteries can be used. Specific examples of the conductive auxiliary agent include acetylene black, carbon nanotubes, and Ketjen black. Only one of these conductive auxiliary agents may be used, or two or more thereof may be used concurrently.

When the slurry is made to contain a conductive auxiliary agent, it is preferable that the slurry is made to contain a dispersant together with the conductive auxiliary agent. Specific examples of the dispersant include polyvinylpyrrolidone, polyvinyl alcohol, polyvinyl butyral, and triazine compounds. Only one of these dispersants may be used, or two or more thereof may be used concurrently.

Then, the slurry is applied on a current collector to thereby form a negative electrode active substance layer composed of the slurry on the surface of the current collector. Thereafter, the solvents (the solvent of the slurry and the solvent contained in the intermediate composition) contained in the negative electrode active substance layer are removed; and the negative electrode active substance layer is subjected to a drying treatment, and subjected to a heat treatment to thereby cure the negative electrode active substance layer. By this heat treatment, the (A) polyacrylic acid, the (B) polyfunctional amine, and the (C) aromatic monoamine contained in the intermediate composition condense to thereby form the polymer compound according to the present embodiment in the negative electrode active substance layer. Although the heat treatment can be carried out in the state that the negative electrode active substance layer contains any solvent, it is more preferable that the heat treatment be carried out in the state that the negative electrode active substance layer has been dried.

Examples of specific methods of the drying treatment and the heat treatment include methods of heating by using heat sources such as hot air, infrared rays, microwaves, and high frequencies under ordinary pressure or reduced pressure. When the heat treatment is carried out, it is preferable that heating be carried out from the current collector side rather than from the negative electrode active substance layer side. Then, it is preferable that the drying treatment be carried out by slowly heating at a low temperature rather than by quickly heating at a high temperature; and it is preferable that the heat treatment be carried out by quickly heating at a high temperature rather than by slowly heating at a low temperature. Such heating can enhance the initial efficiency and the cycle characteristic of power storage devices.

As the current collector, there can be used a known metal material to be used as current collectors for a negative electrode of power storage devices such as rechargeable batteries. Examples of the metal material utilizable for the current collector include silver, copper, gold, aluminum, magnesium, tungsten, cobalt, zinc, nickel, iron, platinum, tin, indium, titanium, ruthenium, tantalum, molybdenum, and stainless steel.

The negative electrode using the polymer compound according to the present embodiment as the binder for a negative electrode can effectively be used for nonaqueous power storage devices having a nonaqueous electrolyte as their electrolyte. Examples of the power storage devices include rechargeable batteries, electric double layer capacitors, and lithium ion capacitors. Further, such power storage devices are useful as nonaqueous rechargeable batteries for driving motors of electric cars and hybrid cars, and as nonaqueous rechargeable batteries to be utilized in personal computers, portable communication devices, household appliances, office devices, industrial devices, and the like.

The present embodiment has the following advantages.

(1) The polymer compound according to the present embodiment is a compound formed by condensing the (A) polyacrylic acid, the (B) polyfunctional amine and the (C) aromatic monoamine; and the chain structure constituted by the (A) polyacrylic acid has free carboxyl groups and carboxyl groups to which the aromatic monoamines are bonded. Further, the polymer compound according to the present embodiment has a chain structure constituted by polyacrylic acid and a crosslinked structure in which carboxyl groups in the chain structure or between the chain structures are connected; the crosslinked structure is at least one crosslinked structure selected from the above formulae (2) to (4). The chain structure has free carboxyl groups and carboxyl groups to which the aromatic monoamines are bonded.

The polymer compound according to the present embodiment is useful as a binder for a negative electrode of power storage devices. By using the polymer compound according to the present embodiment as the binder for a negative electrode, characteristics (initial efficiency and cycle characteristic) of power storage devices can be enhanced.

Particularly, the polymer compound according to the present embodiment is excellent in the effect of improving the cycle characteristic of power storage devices. That is, when using a polymer compound composed of polyacrylic acid or a polyacrylic acid derivative is used as a binder for a negative electrode, a heat treatment or the like carried out in fabrication of a negative electrode dehydration-condenses carboxyl groups the chain structure has and forms a crosslinked structure by an acid anhydride structure in some cases. Since the length of the crosslinked structure by the acid anhydride structure is short, when the crosslinked structure is excessively formed, the chain structures densely approach each other and the polymer compound becomes rigid, and the flexibility of the polymer compound is impaired.

For such a problem, in the polymer compound according to the present embodiment, by making a structure in which part of carboxyl groups the chain structure has is capped by the aromatic monoamine, the side chains are made to be the ones making formation of an acid anhydride structure impossible. Thereby, the number of carboxyl groups capable of forming the acid anhydride structure becomes small and excessive formation of a crosslinked structure by the acid anhydride structure is suppressed. Additionally, the aromatic ring structure of the aromatic monoamine bonded to the carboxyl group becomes a large steric hindrance to mutual approaching of the chain structures. Hence, the polymer compound according to the present embodiment has such a property that the chain structures hardly approach each other. Such a property also suppresses excessive formation of the crosslinked structure by the acid anhydride structure.

In this manner, the suppression of excessive formation of the crosslinked structure by the acid anhydride structure ensures the flexibility of the polymer compound. Thereby, when the polymer compound is used as the binder for a negative electrode, there is improved the conformability to the volume change of the polymer compound by the expansion and contraction along with occlusion and release of lithium and the like. Further, the suppression of excessive formation of the crosslinked structure by the acid anhydride structure suppresses excessive densification of a network structure of the polymer compound and makes it easy for lithium and the like to pass inside the polymer compound. As a result, the cycle characteristic of power storage devices is enhanced.

(2) The polymer compound according to the present embodiment as the binder for a negative electrode has a property of facilitating maintenance of the cycle characteristic of power storage devices even if the weight average molecular weight of the chain structure composed of polyacrylic acid is made low. Hence, also when the polymer compound according to the present embodiment is made to be a polymer compound of a low molecular weight in which chain structure moieties are short, the polymer compound can effectively function as the binder for a negative electrode. Also when the low-molecular weight polymer compound is used as the binder for a negative electrode, a slurry can be prepared by using a smaller amount of a solvent. From this, the solid content ratio of the slurry can be set at a high one. Thereby, since the drying time for volatilizing the solvent from the negative electrode active substance layer when the negative electrode is made is shortened, the productivity of the negative electrode is improved. Therefore, the case of using the polymer compound according to the present embodiment as the binder for a negative electrode facilitates improvement of the productivity of the negative electrode.

(3) In the partial structure of the crosslinked structure represented by the above general formula (5), Y is a straight-chain alkyl group having 1 to 4 carbon atoms, a phenylene group, or an oxygen atom.

According to the above constitution, since the constitution has a movable partial structure in the crosslinked structure, the elasticity of the polymer compound is improved. Thereby, it becomes easy for the binder for a negative electrode using the polymer compound according to the present embodiment to conform to the volume change by expansion and contraction along with occlusion and release of lithium and the like. Consequently, the characteristics of power storage devices are enhanced.

EXAMPLES

Examples more specifying the above embodiment will now be described.
<Test 1>

The battery characteristics of a power storage device when a polymer compound formed by condensing a polyacrylic acid, a polyfunctional amine having a specific molecular structure and an aromatic monoamine was used as its binder for a negative electrode was evaluated. Further, as comparative objects, the battery characteristics of power storage devices when a polymer compound formed by condensing a polyacrylic acid and a polyfunctional amine having a specific molecular structure, a polymer compound formed by condensing a polyacrylic acid, a polyfunctional amine having a specific molecular structure and a non-aromatic monoamine, a polymer compound formed by condensing a polyacrylic acid and an aromatic monoamine, or a polyacrylic acid were used as their binder for a negative electrode was evaluated.

Hereinafter, a polyacrylic acid is represented as PAA; and N-methyl-2-pyrrolidone, as NMP.

Example 1

PAA+4,4'-diaminodiphenylmethane+4-aminophenol

A PAA having a weight average molecular weight of 250,000 was dissolved in NMP to thereby prepare a 15-mass % PAA/NMP solution. 12.7 g (26.5 mmol in terms of monomer of the PAA) of the PAA/NMP solution was taken in a flask in a nitrogen atmosphere. 1.05 g (2.64 mmol) of a 50-mass % NMP solution of 4,4'-diaminodiphenylmethane and 0.144 g (0.66 mmol) of a 50-mass % NMP solution of 4-aminophenol were added in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Example 1 in the state of being an NMP solution.

Reference Example 1

PAA+4,4'-diaminodiphenylmethane

A PAA having a weight average molecular weight of 250,000 was dissolved in NMP to thereby prepare a 15-mass % PAA/NMP solution. 12.7 g (26.5 mmol in terms of monomer of the PAA) of the PAA/NMP solution was taken in a flask in a nitrogen atmosphere. 1.05 g (2.64 mmol) of a 50-mass % NMP solution of 4,4'-diaminodiphenylmethane was added in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Reference Example 1 in the state of being an NMP solution.

Reference Example 2

PAA+4,4'-diaminodiphenylmethane+morpholine

A PAA having a weight average molecular weight of 250,000 was dissolved in NMP to thereby prepare a 15-mass % PAA/NMP solution. 12.7 g (26.5 mmol in terms of monomer of the PAA) of the PAA/NMP solution was taken in a flask in a nitrogen atmosphere. 1.05 g (2.64 mmol) of a 50-mass % NMP solution of 4,4'-diaminodiphenylmethane and 0.04 g (0.66 mmol) of a 50-mass % NMP solution of morpholine were added in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Reference Example 2 in the state of being an NMP solution.

Reference Example 3

PAA+4,4'-diaminodiphenylmethane+benzylamine

A PAA having a weight average molecular weight of 250,000 was dissolved in NMP to thereby prepare a 15-mass % PAA/NMP solution. 12.7 g (26.5 mmol in terms of monomer of the PAA) of the PAA/NMP solution was taken in a flask in a nitrogen atmosphere. 1.05 g (2.64 mmol) of a 50-mass % NMP solution of 4,4'-diaminodiphenylmethane and 0.141 g (0.66 mmol) of a 50-mass % NMP solution of benzylamine were added in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Reference Example 3 in the state of being an NMP solution.

Reference Example 4

PAA+4-aminophenol

A PAA having a weight average molecular weight of 250,000 was dissolved in NMP to thereby prepare a 15-mass % PAA/NMP solution. 12.7 g (26.5 mmol in terms of monomer of the PAA) of the PAA/NMP solution was taken in a flask in a nitrogen atmosphere. 1.15 g (5.28 mmol) of a 50-mass % NMP solution of 4-aminophenol was added in the flask, and stirred at room temperature for 30 min. Thereafter, the resultant was subjected to a heat treatment (preheat treatment) at 110° C. for 2 hours by using a Dean•Stark apparatus to thereby obtain an intermediate composition of Reference Example 4 in the state of being an NMP solution.

Fabrication of Silicon Material 5 g of $CaSi_2$ was added to 20 ml of a concentrated hydrochloric acid containing hydrogen fluoride in a concentration of 1% by mass, ice bathed at 0° C., and stirred for 1 hour; and thereafter, water was added and the resultant was further stirred for 5 min. A yellow powder obtained by filtering the reaction liquid was washed with water and ethanol, and dried under reduced pressure to thereby obtain a layered polysilane. The obtained layered polysilane was heated to 500° C. in an argon atmosphere to thereby obtain a silicon material in which hydrogen had been eliminated from the polysilane.

Fabrication of Electrode Sheet 72.5 parts by mass of the above silicon material, 13.5 parts by mass of an acetylene black and 14 parts by mass of the NMP solution of the intermediate composition of Example 1 were mixed; and NMP was added to the mixture to thereby prepare a slurry. The slurry was applied in a filmy form on the surface of an electrolytic copper foil as a current collector of 30 μm by using a doctor blade method. Then, the electrolytic copper foil and the negative electrode active substance layer were compressed such that the thickness of the negative electrode active substance layer became 20 μm by using a roll press machine to thereby firmly adhere and unite the electrolytic copper foil with the negative electrode active substance layer.

Thereafter, the negative electrode active substance layer from which NMP had been removed and which was in a dried state was subjected to a heat treatment under vacuum (reduced pressure) at 180° C. for 2 hours to thereby condensation-react the intermediate composition contained in the negative electrode active substance layer and thermally cure the negative electrode active substance layer. Thereby, an electrode sheet containing a polymer compound having a crosslinked structure as a binder for a negative electrode was obtained.

Further, similar electrode sheets were each fabricated by using a PAA or the intermediate composition of each Reference Example in place of the NMP solution of Example 1.

Fabrication of Lithium Ion Rechargeable Batteries

A separator was disposed between a negative electrode (evaluation electrode) made by cutting the electrode sheet into a circular shape of 11 mm in diameter and a positive electrode made by cutting a metal lithium foil of 500 μm in thickness into a circular shape of 13 mm in diameter to thereby fabricate a battery of the electrode assembly. The battery of the electrode assembly was accommodated in a battery case; a nonaqueous electrolyte was injected; then, the battery case was sealed to thereby obtain a lithium ion rechargeable battery. As the separator, a glass filter manufactured by Hoechst Celanese Corp. and Celgard 2400 manufactured by Celgard LLC were used. As the nonaqueous electrolyte, a nonaqueous electrolyte in which lithium hexafluorophosphate was dissolved at a concentration of 1 M in a mixed solvent of ethylene carbonate with diethyl carbonate in a volume ratio of 1:1 was used.

Evaluation of Battery Characteristics

For the obtained lithium ion rechargeable batteries, discharging was carried out at a direct current of 0.2 mA until the voltage of the negative electrode to the positive electrode became 0.01 V; and charging at a direct current of 0.2 mA was carried out at 10 min after the finish of the discharging until the voltage of the negative electrode to the positive electrode became 1.0 V. The discharge capacity at this time was taken as an initial discharge capacity; and the charge capacity, as an initial charge capacity. Then, the initial efficiency was calculated based on the following expression. The results are shown in Table 1.

Initial efficiency (%)=(initial charge capacity/initial discharge capacity)×100

Further, with the above charging and discharging being taken as one cycle, the charging and discharging of predetermined cycles was carried out, and the cycle characteristic was calculated based on the following expression. The results are shown in Table 1.

Cycle characteristic (%)=(charge capacity after predetermined cycles/initial charge capacity)×100

TABLE 1

| | Test Example | | | | | |
|---|---|---|---|---|---|---|
| | 1 | 2 | 3 | 4 | 5 | 6 |
| Binder for Negative Electrode | Example 1 | Reference Example 1 | Reference Example 2 | Reference Example 3 | Reference Example 4 | PAA |
| Polyfunctional Amine | Present | Present | Present | Present | Absent | Absent |
| Monoamine | Aromatic | — | Non-aromatic | Non-aromatic | Aromatic | — |
| Initial Discharge Capacity (mAh/g) | 1700 | 1705 | 1720 | 1777 | 1520 | 1811 |
| Initial Efficiency (%) | 83 | 83 | 83.4 | 82.5 | 71.8 | 83.2 |
| Cycle Characteristic (%) 50 cycles | 78.2 | 73.6 | 66.3 | 70.8 | 19.5 | 28.9 |

As indicated in Table 1, it was confirmed that, in Test Examples 1 to 4, which used, as their binder for a negative electrode, a polymer compound in which a polyfunctional amine was condensed, evaluation of the cycle characteristic became higher as compared with Test Example 6, which used PAA as a binder for a negative electrode, and Test Example 5, which used, as a binder for a negative electrode, a polymer compound in which no polyfunctional amine was condensed. From this result, it is implied that the presence of a crosslinked structure formed by a polyfunctional amine largely affects the cycle characteristic.

It was then confirmed that in Test Example 1, which used, as a binder for a negative electrode, a polymer compound in which an aromatic monoamine was condensed among the polymer compounds in which a crosslinked structure was formed by condensing a polyfunctional amine, evaluation of the cycle characteristic became higher as compared with Test Example 2, which used, as a binder for a negative electrode, a polymer compound in which no aromatic monoamine was condensed. By contrast, it was confirmed that in Test Example 3 and Test Example 4, which each used, as their binder for a negative electrode, a polymer compound in which a non-aromatic monoamine was condensed, evaluation of the cycle characteristic became lower as compared with Test Example 2, which used, as a binder for a negative electrode, a polymer compound in which no aromatic monoamine was condensed.

From this result, it is implied that the effect of improving the cycle characteristic by the condensation of a monoamine in a polymer compound in which a crosslinked structure is formed by condensing a polyfunctional amine cannot be attained when a non-aromatic monoamine is condensed, and the effect is an effect peculiar to the case where an aromatic monoamine is condensed.

<Test 2>

For the electrode sheets of Example 1 and Reference Example 1, each electric resistance thereof in charging and discharging in specific states of charge (15%, 85%) were measured.

94 parts by mass of a lithium-containing metal oxide having a rock salt structure represented by $LiNi_{5/10}Co_{2/10}Mn_{3/10}O_2$, 3 parts by mass of an acetylene black, and 3 parts by mass of a polyvinylidene fluoride were dispersed in NMP to thereby prepare a slurry. The slurry was applied in a filmy form on the surface of an aluminum foil as a current collector of 20 μm by using a doctor blade method. Then, NMP in the slurry was volatilized and removed to thereby form a positive electrode active substance layer on the aluminum foil. Then, the aluminum foil and the positive electrode active substance layer were compressed so that the thickness of the positive electrode active substance layer became 60 μm by using a roll press machine to thereby firmly adhere and unite the aluminum foil with the positive electrode active substance layer. Thereafter, the positive electrode active substance layer from which NMP had been removed and which was in a dried state was subjected to a heat treatment under vacuum (reduced pressure) at 120° C. for 6 hours to thereby obtain an electrode sheet for a positive electrode.

Then, a separator of 20 μm in thickness composed of a porous polyethylene film was interposed between the above electrode sheet for a positive electrode and the electrode sheet for a negative electrode of Example 1 or Reference Example 1 to thereby fabricate an electrode plate group. The electrode plate group was disposed inside a baglike film member, composed of a laminate film, whose one side was opened, and a nonaqueous electrolyte was injected. Herein, a nonaqueous electrolyte in which lithium hexafluorophosphate was dissolved in a concentration of 1M in a mixed solvent of ethylene carbonate, dimethyl carbonate and ethyl methyl carbonate in a volume ratio of 3:4:3 was used. Thereafter, the opened one side of the film member was sealed to thereby obtain a lithium ion rechargeable battery in which the electrode plate group and the nonaqueous electrolyte were hermetically enclosed in the film member.

Measurement of Electric Resistance

The obtained lithium ion rechargeable battery was charged at a current corresponding to 0.33 C up to 4.5 V as an SOC of 100%. After the charging, the battery was allowed to stand still for 10 min, and discharged at a current corresponding to 0.33 C down to 2.5 V as an SOC of 0%. Thereafter, the battery was charged at a current corresponding to 1 C up to 4.2 V as an SOC of 85%; and an electric resistance (electric resistance-85% in charging) at this time was measured. The battery was further allowed to stand still for 10 min, and discharged at a current corresponding to 1 C; and an electric resistance (electric resistance-85% in discharging) at this time was measured. Further, the charging voltage was set at 2.8 V as an SOC of 15% and electric resistances-15% in charging and discharging were similarly measured. The results are shown in Table 2.

TABLE 2

|  |  | Test Example | |
|---|---|---|---|
|  |  | 7 | 8 |
| Binder for Negative Electrode |  | Example 1 | Reference Example 1 |
| Polyfunctional Amine |  | Present | Present |
| Monoamine |  | Aromatic | — |
| Electric Resistance in Charging (Ω) | 15% | 7.38 | 8.66 |
|  | 85% | 3.78 | 4.64 |
| Electric Resistance in Discharging (Ω) | 15% | 4.70 | 5.31 |
|  | 85% | 3.74 | 4.66 |

As indicated in Table 2, it was confirmed that in Test Example 7, which used, as a binder for a negative electrode, the polymer compound of Example 1 in which an aromatic monoamine was condensed, the electric resistances in charging and discharging at each voltage were reduced as compared with Test Example 8, which used, as a binder for a negative electrode, the polymer compound of Reference Example 1 in which no aromatic monoamine was condensed. From this result, it is conceivable that the improving effect of the cycle characteristic, confirmed in Test 1, attained when a polymer compound in which the aromatic monoamine was condensed is used as a binder for a negative electrode is caused by the reduction of the electric resistance.

<Test 3>

In the case of using, as a binder for a negative electrode, a polymer compound formed by condensing a PAA, a polyfunctional amine having a specific molecular structure and an aromatic monoamine, the changes in battery characteristics of a power storage device when the blend proportion of the aromatic monoamine was varied were evaluated.

Examples 1-1 to 1-4

PAA+4,4'-diaminodiphenylmethane+4-aminophenol

Intermediate compositions of Examples 1-1 to 1-4 were obtained by varying the blend amount of 4-aminophenol (aromatic monoamine) contained in the intermediate composition of Example 1. The blend amount of 4-aminophenol of each Example is indicated in the column of aromatic monoamine in Table 3. The intermediate compositions of Examples 1-1 to 1-4 were prepared by the same method in Example 1, except for that the blend amount of 4-aminophenol was different. The intermediate composition of Example 1-3 was the same as that of Example 1.

Evaluation of Battery Characteristics

By using the intermediate compositions of Examples 1-1 to 1-4 each, an electrode sheet using, as a binder for a negative electrode, a polymer compound obtained from each intermediate composition was fabricated. A fabrication method of the electrode sheet was the same as in Test 1. Then, a lithium ion rechargeable battery was fabricated by using the obtained electrode sheet, and battery characteristics of the lithium ion rechargeable battery were evaluated. The results are shown in Table 3. A fabrication method of the lithium ion rechargeable battery and the evaluation method of battery characteristics of the lithium ion rechargeable battery were the same as in Test 1.

In Table 3, a is the total number of carboxyl groups derived from the PAA (molar number in terms of monomer of the PAA); b is the total number of amino groups derived from the polyfunctional amine (a molar number of the polyfunctional amine x the number (2) of amino groups of the polyfunctional amine); and c is the total number of amino groups derived from the aromatic monoamine (molar number of the aromatic monoamine).

TABLE 3

| | Test Example | | | |
|---|---|---|---|---|
| | 9 | 10 | 11 | 12 |
| Binder for Negative Electrode | Example 1-1 | Example 1-2 | Example 1-3 | Example 1-4 |
| PAA (mmol) | 26.5 | 26.5 | 26.5 | 26.5 |
| Polyfunctional Amine (mmol) | 2.64 | 2.64 | 2.64 | 2.64 |
| Aromatic Monoamine (mmol) | 0.07 | 0.25 | 0.66 | 1.0 |
| a/b | 5/1 | 5/1 | 5/1 | 5/1 |
| c/(a-b-c) | 0.003/1 | 0.012/1 | 0.032/1 | 0.049/1 |
| Initial Discharge Capacity (mAh/g) | 1699 | 1711 | 1700 | 1678 |
| Initial Efficiency (%) | 82.8 | 83.1 | 83 | 82.5 |
| Cycle Characteristic (%) 50 cycles | 73.7 | 76.9 | 78.2 | 75.6 |

As indicated in Table 3, it was confirmed from the results of Test Examples 9 to 11 that the cycle characteristic was likely to be improved with the increasing blend proportion of the aromatic monoamine. It was further confirmed from the results of Test Examples 11 to 12 that when the blend proportion of the aromatic monoamine exceeded some range, the improving effect of the cycle characteristic was likely to become small with the increasing blend proportion of the aromatic monoamine. From these results, it is implied that a more suitable range in the blend proportion of the aromatic monoamine may exist in the viewpoint of the improving effect of the cycle characteristic.

The invention claimed is:

1. A polymer compound to be used as a binder for a negative electrode of a power storage device, wherein
the polymer compound is formed by condensing a polyacrylic acid, a polyfunctional amine represented by the following general formula (1), and an aromatic monoamine,
a chain structure constituted by the polyacrylic acid has free carboxyl groups and carboxyl groups to which the aromatic monoamines are bonded:

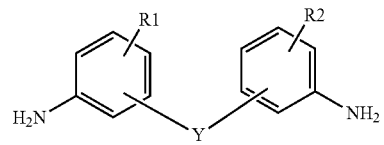

(1)

where
Y is a straight-chain alkyl group having 1 to 4 carbon atoms, a phenylene group, or an oxygen atom, and
R1 and R2 are each independently one or more hydrogen atoms, a methyl group, an ethyl group, a trifluoromethyl group, or a methoxy group.

2. A negative electrode of a power storage device, comprising:
a binder for a negative electrode containing a polymer compound according to claim 1, and
a negative electrode active substance,
wherein the negative electrode active substance is at least one selected from carbon-based materials capable of occluding and releasing lithium, elements alloyable with lithium, and compounds having an element alloyable with lithium.

3. The negative electrode according to claim 2, wherein the negative electrode active substance is at least one selected from silicon materials obtained from $CaSi_2$ through a calcium-removal reaction, Si and $SiO_v$, in which $0<V \leq 2$.

4. A power storage device comprising:
the negative electrode according to claim 3; and
a nonaqueous electrolyte.

5. An intermediate composition of a polymer compound to be used as a binder for a negative electrode of a power storage device,
the intermediate composition being in a liquid state and containing a polyacrylic acid, a polyfunctional amine represented by the following general formula (1), an aromatic monoamine, and a nonaqueous solvent:

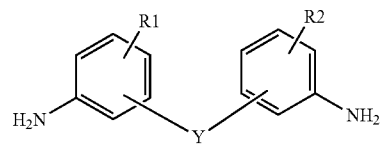

(1)

where
Y is a straight-chain alkyl group having 1 to 4 carbon atoms, a phenylene group or an oxygen atom, and
R1 and R2 are each independently one or more hydrogen atoms, a methyl group, an ethyl group, a trifluoromethyl group, or a methoxy group.

6. A slurry for a negative electrode to be used for production of a negative electrode of a power storage device, wherein
the slurry contains the intermediate composition according to claim 5, a negative electrode active substance, and a solvent, and
the negative electrode active substance is at least one selected from carbon-based materials capable of occluding and releasing lithium, elements alloyable with lithium, and compounds having an element alloyable with lithium.

7. A method for producing a negative electrode of a power storage device, wherein a negative electrode active substance layer is formed on a current collector by using a slurry for the negative electrode according to claim 6.

8. The method for producing a negative electrode according to claim 7,
wherein the slurry for a negative electrode contains, as the negative electrode active substance, at least one selected from silicon materials obtained from CaSi2 through a calcium-removal reaction, Si, and SiO$_y$ in which 0<V≤2.

9. A polymer compound to be used as a binder for a negative electrode of a power storage device, wherein
the polymer compound has a chain structure constituted by a polyacrylic acid, and a crosslinked structure connecting carboxyl groups in the chain structure or between the chain structures with each other,
the crosslinked structure is at least one crosslinked structure selected from the following general formulae (2) to (4), and
the chain structure has free carboxyl groups and carboxyl groups to which aromatic monoamines are bonded:

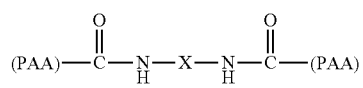
(2)

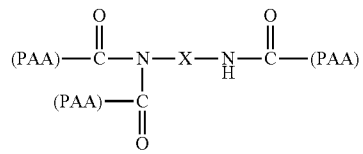
(3)

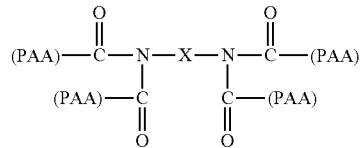
(4)

where PAA denotes the chain structure constituted by the polyacrylic acid; and X is a structure represented by the following general formula (5):

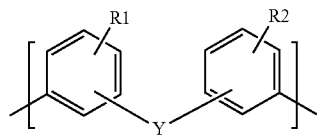
(5)

where
Y is a straight-chain alkyl group having 1 to 4 carbon atoms, a phenylene group, or an oxygen atom, and
R1 and R2 are each independently a hydrogen atom, a methyl group, a trifluoromethyl group, or a methoxy group.

10. The polymer compound according to claim 9, wherein a proportion of the carboxyl group to which the aromatic monoamine is bonded to the free carboxyl group is in the range of 0.001 to 0.15.

11. A method for producing a polymer compound according to claim 9, comprising heating a polyacrylic acid, a polyfunctional amine represented by the following general formula (1), and an aromatic monoamine at 150 to 230° C.:

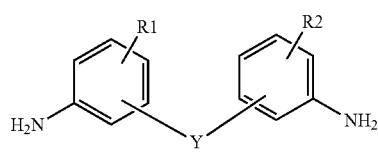
(1)

where
Y is a straight-chain alkyl group having 1 to 4 carbon atoms, a phenylene group, or an oxygen atom, and
R1 and R2 are each independently one or more hydrogen atoms, a methyl group, an ethyl group, a trifluoromethyl group, or a methoxy group.

12. A negative electrode of a power storage device, comprising:
a binder for a negative electrode containing a polymer compound according to claim 9; and
a negative electrode active substance,
wherein the negative electrode active substance is at least one selected from carbon-based materials capable of occluding and releasing lithium, elements alloyable with lithium, and compounds having an element alloyable with lithium.

* * * * *